United States Patent

Kitaoka et al.

[11] Patent Number: 5,343,137
[45] Date of Patent: Aug. 30, 1994

[54] APPARATUS TO PREVENT COMPLETE BATTERY DISCHARGE

[75] Inventors: Kazuhiro Kitaoka; Akihiro Furuse; Fumiki Takesue; Tsukasa Ito, all of Sumoto, Japan

[73] Assignee: Sanyo Electric Co., Ltd., Osaka, Japan

[21] Appl. No.: 9,635

[22] Filed: Jan. 27, 1993

[30] Foreign Application Priority Data

Jan. 28, 1992 [JP] Japan .................. 4-013136

[51] Int. Cl.⁵ .................. H02H 7/18; H02J 7/00
[52] U.S. Cl. .................. 320/13; 307/10.7
[58] Field of Search .......... 320/5, 13, 31, 32, 37, 320/38, 39, 40; 307/10.7

[56] References Cited

U.S. PATENT DOCUMENTS

| 4,086,525 | 4/1978 | Ibsen et al. ............ 320/40 X |
| 4,210,855 | 7/1980 | Harer et al. ............ 320/13 |
| 4,698,578 | 10/1987 | Mullersman et al. ........ 320/13 |
| 4,950,913 | 8/1990 | Kephart ............... 307/10.7 |
| 5,089,762 | 2/1992 | Sloan ................ 320/13 |
| 5,140,250 | 8/1992 | Morland .............. 320/13 |
| 5,155,428 | 10/1992 | Kang ................. 320/13 |
| 5,159,257 | 10/1992 | Oka et al. ............ 320/13 |
| 5,200,877 | 4/1993 | Betton et al. .......... 320/13 X |

FOREIGN PATENT DOCUMENTS 62-34083 2/1987 Japan .

Primary Examiner—Kristine L. Peckman
Attorney, Agent, or Firm—Wenderoth, Lind & Ponack

[57] ABSTRACT

To prevent the complete discharge of a battery connected to a load, a battery voltage of the battery is compared with a reference voltage, and a switch is activated to open an electrical connection between the battery and the load when the detected battery voltage falls below the reference voltage. To compensate for dynamic characteristics of the battery and the load, a battery current flowing through the battery is detected and a value of the reference voltage is continuously set according to the detected battery current. Similarly, a battery temperature of the battery also controls the reference voltage. Also, a timer may be provided to cause the switch to open the connection between the battery and the load only when the detected battery voltage remains below the reference voltage for a predetermined period of time.

3 Claims, 4 Drawing Sheets

APPARATUS TO PREVENT COMPLETE BATTERY DISCHARGE

BACKGROUND OF THE INVENTION

This invention relates to apparatus for preventing complete discharge of a battery, and more particularly, to an apparatus for preventing complete discharge of a battery used in a powered vehicle such as an electric automobile.

In recent years pollution caused by automobile exhaust gases has come to be viewed as a serious problem. For this reason, the electric automobile is in the limelight for implementation as a non-polluting automobile. This electric automobile commonly uses storage cells such as Ni—Cd (nickel-cadmium) batteries as its power source. Specifically, with the Ni—Cd battery used as the power source, it is repeatedly recharged and reused whenever battery voltage drops off. However, continuous discharge of the Ni—Cd battery eventually results in complete discharge, causing drastic reduction in the lifetime of the battery. Consequently, to keep the battery from discharging completely, a means of detecting depleted battery voltage and disconnecting the battery from the driving circuit of the electric automobile is required.

In general, the motion of an electric automobile is complex, and the state of the storage battery corresponding to that motion is also complex. The storage battery's terminal voltage as well as voltage level discharge current varies over a wide range. For example, when a large load is put on the electric automobile during sudden acceleration from a stop or in overcoming a steep hill, very large discharge currents flow momentarily from the storage battery and the terminal voltage exhibits a corresponding in voltage level large change. When the automobile returns to steady state motion, the discharge current from the storage battery decreases, and the change in terminal voltage consequently settles down. In this fashion, storage battery parameters describe a complex pattern corresponding to the motion of the electric automobile.

Formerly, it has been common practice to measure storage battery terminal voltage and disconnect the battery from the driving circuit at a prescribed voltage. The problem with this is that, as described above, since storage battery terminal voltage varies wildly corresponding to electric automobile motion, terminal voltage can drop and the storage battery can be disconnected from the driving circuit even though the battery still has sufficient reserve power capacity. Consequently, this results in very short electric automobile driving time. Considering this situation and setting the prescribed voltage lower can result in steady state operation of the electric automobile without terminal voltage reduction below the prescribed voltage, continued battery discharge, and finally complete battery discharge. To solve the above mentioned problems, the present invention responds to the motion of an electric automobile to accurately prevent complete storage battery discharge. Specifically, the storage battery is disconnected from the driving circuit of the electric automobile when storage battery parameters corresponding to automobile motion satisfy prescribed conditions.

SUMMARY OF THE INVENTION

The apparatus of the present invention for preventing complete battery discharge comprises a load which is connected in series with the battery and is driven by the battery, a current detector means which is connected in series with the battery and senses current from the battery, a voltage detector means which is connected in parallel with the battery and senses battery voltage, a switching means which intervenes between the battery and the load to open or close the circuit between the battery and the load, and a computation means for effecting computations with the output from the current detector means and the voltage detector means. The computation means is provided with a comparator unit to compare the output of the voltage detector means with a reference voltage, and a battery state detector unit to continuously revise the reference voltage based on computations performed on the output of the current detector means. The comparator unit of the computation means compares the output of the voltage detector means with the reference voltage and turns the previously mentioned switching means off when the output voltage of the voltage detector means drops below the reference voltage.

In addition, the apparatus of the present invention computes not only load current, but both current and temperature to turn the switching means off. In addition to the current detector means, this apparatus is provided with a temperature sensing means to sense battery temperature. The battery state detector unit of the computation means calculates reference voltage using both current and temperature. The reference voltage calculated by the battery state detector unit is compared to the output of the voltage detector means, and the switching means is switched off by the computation means when the output voltage of the voltage detector means drops below the reference voltage.

Further, the apparatus of the present invention is provided with a timer unit in the computation means. The computation means having the timer unit turns the switching means off after the output of the voltage detector means remains below the reference voltage for a prescribed length of time.

DETAILED DESCRIPTION OF THE INVENTION

Figure 1:
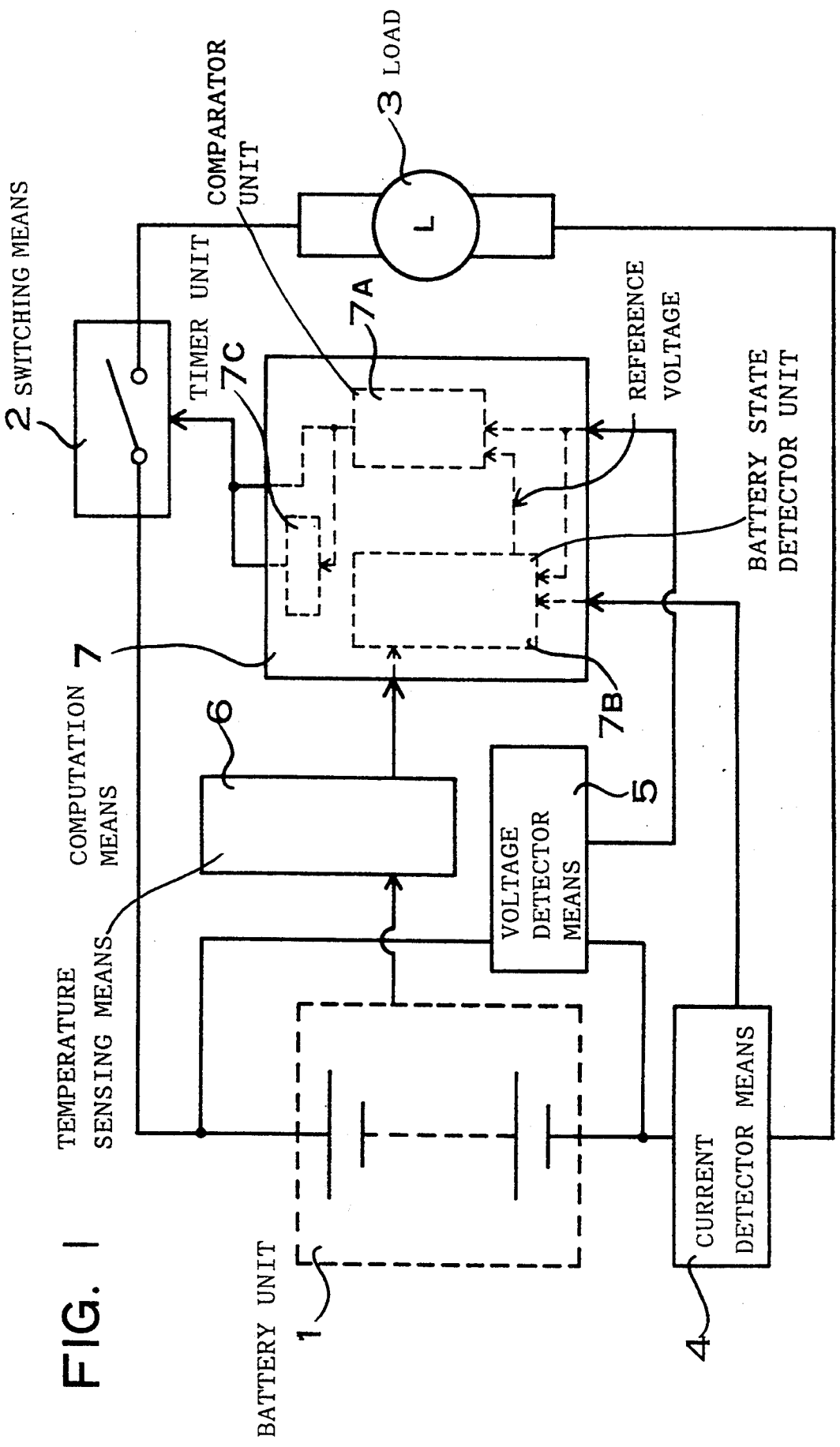
FIG. 1 is a block diagram of the circuit of the present invention.

In the apparatus of the present invention for preventing complete battery discharge, battery current is sensed with the current detector means, and battery voltage is sensed with the voltage detector means. Meanwhile, the comparator unit provided in the computation means compares the output of the voltage detector means with the reference voltage. Further, the battery state detector unit provided in the computation means continuously changes the reference voltage based on computations using the current detector means output.

For example, when current flowing from the battery is large, and therefore, the accompanying battery voltage reduced, the battery state detector unit using output from the current detector circuit causes a reduction in reference voltage. In this manner, the battery state detector unit determines the condition of the battery from the current detector means and responds by continuously changing the reference voltage. The purpose of this is to respond to the wildly changing storage battery terminal voltage corresponding to factors such as the state of motion of the electric automobile.

The computation means turns the switching means off when voltage detector means output, in other words battery voltage, drops below the reference voltage. At this time the battery is disconnected from the load, and complete battery discharge is prevented. Further, the apparatus of the present invention can turn the switching means off by sensing battery temperature in addition to battery current. This apparatus for preventing complete battery discharge is provided with a current detector means, a voltage detector means, and also a temperature sensor to sense battery temperature as well. The battery state detector unit of the computation means performs computations with the output of both the current detector means and the temperature sensing means, and continuously revises the reference voltage based on the results of those computations.

As previously stated, the battery state detector unit of the computation means causes a reduction in reference voltage due to a large battery current and its accompanying battery voltage reduction. Moreover, when battery temperature high, the active material of the battery's electricity generating elements is highly activated and battery voltage is increased. Therefore, the reference voltage is also increased in this case. In an apparatus for preventing complete battery discharge with this configuration, the condition of the battery is determined by the current detector means and the temperature sensing means, and according to that condition, the reference voltage can be continuously changed and updated.

Further, the apparatus of the present invention can also include a timer unit within the computation means. The timer unit provided in the computation means outputs a signal to turn off the switching means when the voltage detector means output, in other words the battery voltage, drops below the reference voltage and remains below it for a prescribed time interval. At this time the battery is disconnected from the load, and complete battery discharge is prevented.

The following describes in detail an embodiment of the present invention. Turning to the block diagram of FIG. 1, reference numeral 1 is a battery unit having a plurality of series connected Ni—Cd batteries. A switching means 2, load 3, and current detector means 4 are connected in series with the battery unit 1. Also, a voltage detector means 5 is connected in parallel with the battery unit 1. A temperature sensing means 6 is provided in close proximity with the battery unit 1 to allow for battery unit temperature detection. Output from the current detector means 4, the voltage detector means 5, and the temperature sensing means 6 are fed into the computation means 7. The load 3 is the driving unit which provides locomotion to the electric vehicle.

Figure 2:
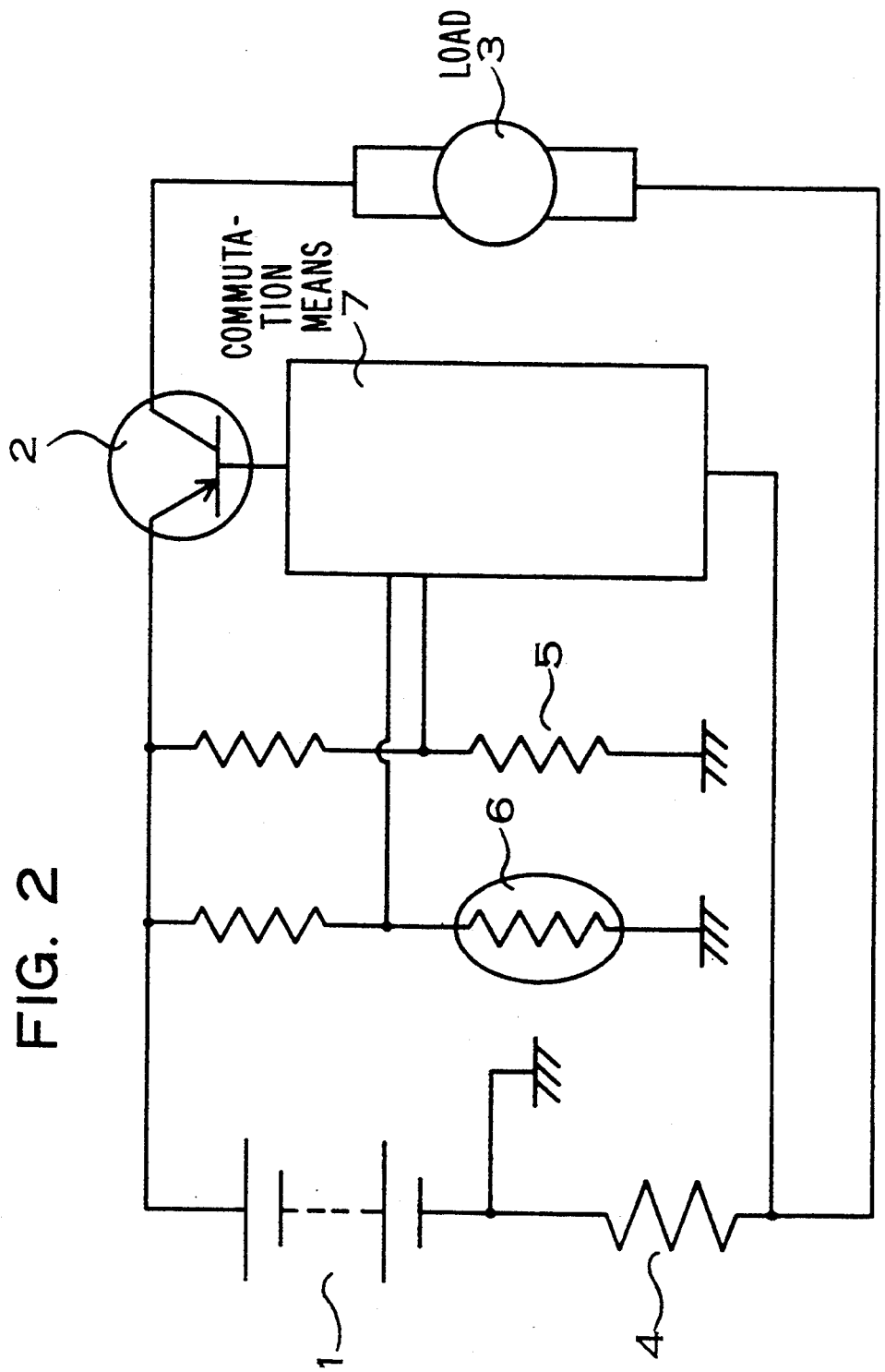
FIG. 2 is a schematic drawing showing one embodiment of the block diagram of FIG. 1.

FIG. 2 shows a specific circuit realization of the block diagram of FIG. 1. The switching means 2 is a pnp transistor with its emitter and collector connected between the battery unit 1 and the load 3. The pnp transistor is turned on when base current is flowing and off when base current is not flowing. The base current of the pnp transistor is controlled by the computation means 7. The current detector means 4 is made up of a current detector resistor connected in series with the battery unit 1. A voltage proportional to the load current is produced across the current detector resistor. The voltage across the current detector resistor is input to the computation means 7. The voltage detector means 5 is made up of two voltage divider resistors. A voltage proportional to the battery voltage is produced at the center-point of the voltage divider. This voltage is input to the computation means 7. The temperature sensing means 6 is made up of a thermistor with resistance that varies in proportion to the temperature of the battery unit 1. Thermistor output is also fed into the computation means 7.

Referring again to FIG. 1, the computation means 7 comprises a comparator unit 7A, a battery state detector unit 7B, and a timer unit 7C. The comparator unit 7A compares the output of the voltage detector means 5 with the reference voltage. The battery state detector unit 7B continuously changes the reference voltage based on the results of computations carried out with outputs from the current detector means 4 and the temperature sensing means 6. The timer unit 7C outputs an off signal to the switching means 2 when the voltage detector means 5 output drops below the reference voltage and remains in that state for a prescribed time interval.

Figure 3:
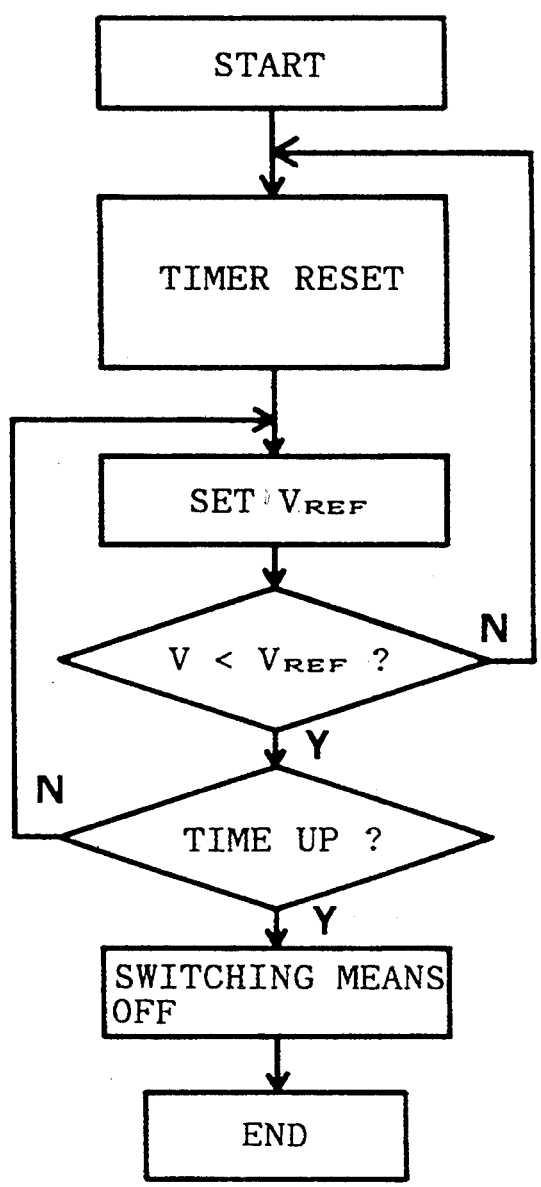
FIG. 3 is a flow-chart showing the operation of the present invention.

The flow-chart of FIG. 3 shows the operation of an apparatus for preventing complete battery discharge having the configuration described above. When the load, powered by the battery unit 1, begins to drive the vehicle, the current detector means 4 measures current from the battery unit 1, the voltage detector means 5 measures voltage across the battery unit 1, the temperature sensing means 6 measures temperature from the battery unit 1, and these measurements are output to the computation means 7. Meanwhile, a reference voltage is prepared in the computation means 7. The comparator unit 7A in the computation means 7 compares the output of the voltage detector means 5 with the reference voltage. Also, the battery state detector unit 7B in the computation means 7 continuously revises the reference voltage based on the results of computations using the outputs from the current detector means 4 and the temperature sensing means 6.

For example, since battery voltage is reduced when a large current flows from the battery, the battery state detector unit 7B makes computations that cause a reduction in the reference voltage. Also, when battery temperature is high, the active material of the battery's electricity generating elements is highly activated and battery voltage is increased. Therefore, reference voltage is increased in this case. In this manner, the battery state detector unit 7B determines the condition of the battery from the current detector means 4 and temperature sensing means 6, and responds by continuously changing the reference voltage. The purpose of this is to respond to the wildly changing storage battery terminal voltage corresponding to the state of motion of the electric vehicle.

Figure 4:
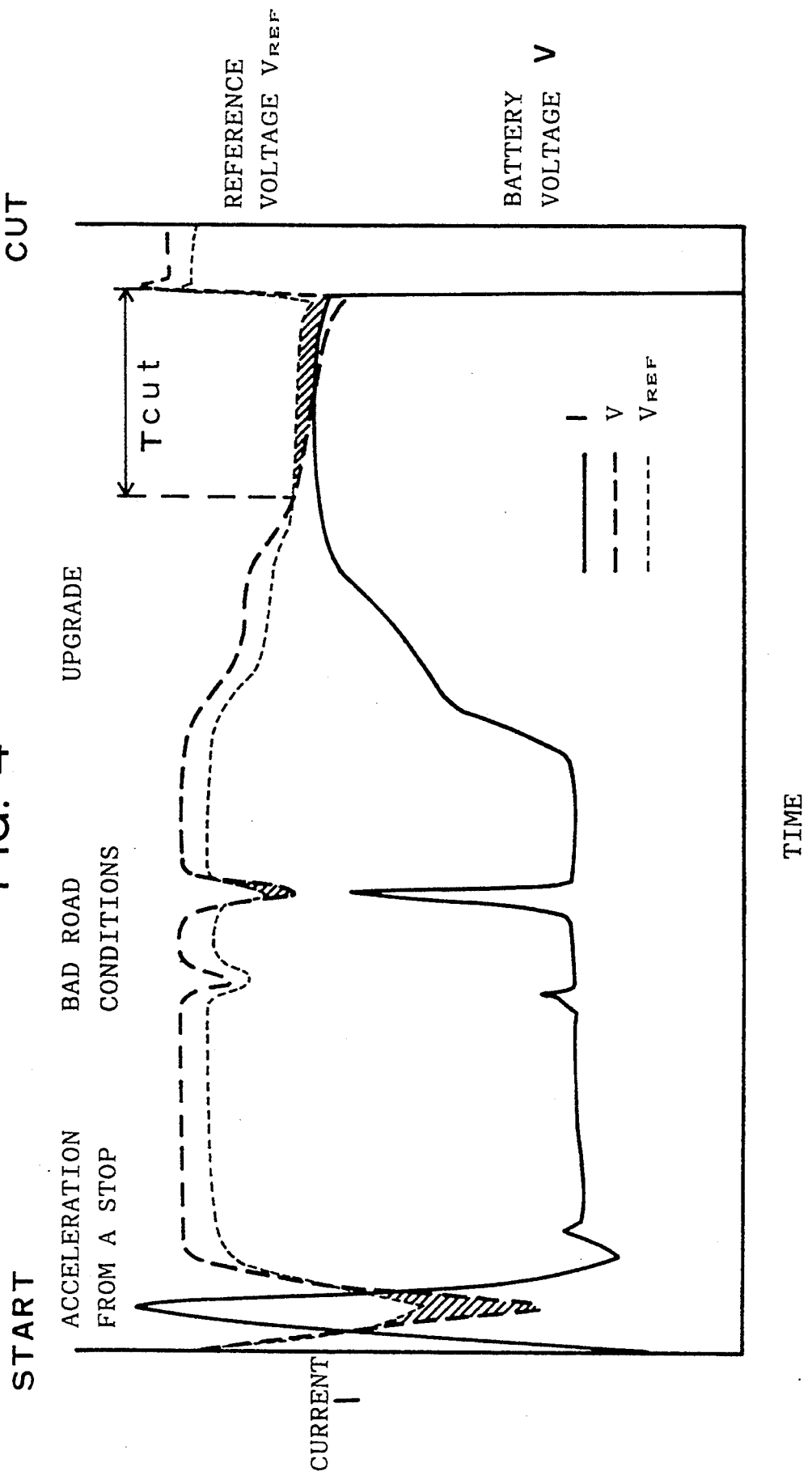
FIG. 4 is a graph showing the variation in battery unit current, battery unit voltage, and reference voltage corresponding to battery state and motion of an electric automobile.

FIG. 4 shows variation in battery unit current and voltage corresponding to electric automobile motion. FIG. 4 also shows reference voltage variation corresponding to the state of the battery. According to this graph, when vehicle movement begins, large currents are required, and therefore, current from the battery unit 1 is large. Accompanying this, battery voltage is reduced. Further, when the electric automobile encounters bad road conditions such as a gravel road or encounters an upgrade, the load during movement increases, and again the current increases and battery voltage decreases. On the other hand, battery temperature also changes depending on the temperature during movement. In this case, as mentioned previously, battery voltage during discharge increases in response to increased battery temperature.

The timer unit 7C in the computation means 7 outputs a signal to open the switching means 2 when the voltage detector means 5 output, in other words the battery voltage, drops below the reference voltage and remains below it for a prescribed time interval. At this time the battery unit 1 is disconnected from the load, and complete discharge of the battery unit 1 is prevented. The purpose of this is to prevent the switching means 2 from being mistakenly opened disconnect the battery unit 1 from the load 3 in cases such as acceleration from a stop when battery unit 1 voltage drops momentarily.

An apparatus for preventing complete battery discharge having the above configuration senses battery current and temperature, and in addition uses a computation means timer unit to turn the switching means off when the battery voltage becomes lower than the reference voltage for a given time interval. An apparatus with this configuration prevents complete battery discharge in an ideal fashion. Specifically, an apparatus with this configuration can completely utilize the battery's full power capacity without causing it to fully discharge. This results in a drastic reduction in battery lifetime degradation, even when the battery is repeatedly charged and discharged.

It should be noted that the apparatus of the present invention for preventing complete battery discharge may not sense battery temperature, but instead may sense only battery voltage to turn off the switching means. Further, the computation means may not be provided with a timer unit, and the switching means may be switched off as soon as the battery voltage drops below the reference voltage.

We claim:

1. An apparatus for preventing complete discharge of a battery electrically connected in series with a load, said apparatus comprising:
   current detector means, connected in series with the battery, for detecting a battery current flowing through the battery;
   voltage detector means, connected in parallel with the battery, for detecting a battery voltage of the battery;
   switching means, connected between the load and the battery, for selectively closing and opening an electrical connection between the load and the battery; and,
   computation means for controlling said switching means in accordance with the battery current detected by said current detector means and the battery voltage detected by said voltage detector means;
   wherein said computation means includes
   (a) battery state detecting means for generating a reference voltage having a voltage level dependent on the battery current detected by said current detector means, said battery state detecting means responsive to said current detector means to decrease the reference voltage when the battery current increases and to increase the reference voltage when the battery current decreases,
   (b) comparator means for comparing the reference voltage generated by said battery state detecting means with the battery voltage detected by said voltage detector means, and for generating a first output signal when the battery voltage detected by said voltage detector means becomes less than the reference voltage generated by said battery state detecting means, and
   (c) timer means for detecting a discharge state in which the first output signal is generated by said comparator means for more than a predetermined time period, and for controlling said switching means to open the electrical connection between the load and the battery upon detecting the discharge state.

2. An apparatus for preventing complete discharge of a battery electrically connected in series with a load, said apparatus comprising:
   current detector means, connected in series with the battery, for detecting a battery current flowing through the battery;
   voltage detector means, connected in parallel with the battery, for detecting a battery voltage of the battery;
   temperature detector means for detecting a battery temperature of the battery;
   switching means, connected between the load and the battery, for selectively closing and opening an electrical connection between the load and the battery; and,
   computation means for controlling said switching means in accordance with the battery current detected by said current detector means, the battery voltage detected by said voltage detector means and the battery temperature detected by said temperature detector means;
   wherein said computation means includes
   (a) battery state detecting means for generating a reference voltage having a voltage level dependent on the battery current detected by said current detector means and the battery temperature detected by said temperature detector means, said battery state detecting means being responsive to said current detector means to decrease the reference voltage when the battery current increases and to increase the reference voltage when the battery current decreases, and being responsive to said temperature detector means to increase the reference voltage when the battery temperature increases and to decrease the reference voltage when the battery current decreases, and
   (b) comparator means for comparing the reference voltage generated by said battery state detecting means with the battery voltage detected by said voltage detector means, and for generating a first output signal when the battery voltage detected by said voltage detector means becomes less than the reference voltage generated by said battery state detecting means, wherein said switching means is responsive to said first output signal to open the electrical connection between the load and the battery.

3. An apparatus as claimed in claim 2, wherein said computation means further includes timer means for detecting a discharge state in which the first output signal is generated by said comparator means for more than a predetermined time period, and for controlling said switching means to open the electrical connection between the load and the battery upon detecting the discharge state.

* * * * *